United States Patent
Mecikalski

(10) Patent No.: US 11,181,665 B2
(45) Date of Patent: Nov. 23, 2021

(54) SYSTEMS AND METHODS FOR MONITORING UPDRAFTS IN CLOUDS

(71) Applicant: John R. Mecikalski, Madison, AL (US)

(72) Inventor: John R. Mecikalski, Madison, AL (US)

(73) Assignee: Board of Trustees of the University of Alabama, Huntsville, AL (US)

( * ) Notice: Subject to any disclaimer, the term of this patent is extended or adjusted under 35 U.S.C. 154(b) by 31 days.

(21) Appl. No.: 16/824,850

(22) Filed: Mar. 20, 2020

(65) Prior Publication Data

US 2020/0355846 A1    Nov. 12, 2020

Related U.S. Application Data

(63) Continuation-in-part of application No. 15/217,731, filed on Jul. 22, 2016, now Pat. No. 10,670,771.

(60) Provisional application No. 62/259,874, filed on Nov. 25, 2015.

(51) Int. Cl.
*G01W 1/10* (2006.01)
*B64D 43/00* (2006.01)
*G05D 1/10* (2006.01)
*G01W 1/00* (2006.01)

(52) U.S. Cl.
CPC ............. *G01W 1/10* (2013.01); *B64D 43/00* (2013.01); *G05D 1/1062* (2019.05); *G01W 2001/003* (2013.01)

(58) Field of Classification Search
None
See application file for complete search history.

(56) References Cited

U.S. PATENT DOCUMENTS

| | | |
|---|---|---|
| 6,581,009 B1 | 6/2003 | Smith |
| 6,920,233 B2 | 7/2005 | Wofson et al. |
| 6,961,061 B1 | 11/2005 | Johnson et al. |
| 7,043,368 B1 | 5/2006 | Cote et al. |
| 7,062,066 B2 | 6/2006 | Wolfson et al. |
| 7,181,345 B2 | 2/2007 | Rosenfeld et al. |
| 7,250,952 B2 | 7/2007 | Johnson et al. |

(Continued)

OTHER PUBLICATIONS

Haass et al., "Estimation of Cloud Motion from Satellite Pictures", IEEE International Conference on Acoustics, Speech, and Signal Processing, ICASSP '80, Denver, Colorado, USA, Apr. 9-11, 1980, pp. 422-425 (Year: 1980).*

(Continued)

*Primary Examiner* — Brent A. Fairbanks
(74) *Attorney, Agent, or Firm* — Maynard Cooper & Gale, P.C.; Jon E. Holland

(57) ABSTRACT

A weather forecasting system may receive satellite image samples and identify an updraft and components of the updraft within a cloud. These satellite image samples are collected over time (e.g., at 30 second to 1 minute time intervals). The system may identify an area of rotation and/or divergence at cloud top in a cumulus cloud or mature convective storm over time by comparing the samples and determine a parameter indicative of the updraft based on the area of rotation and divergence. The system may estimate aspects of the environment related to storm development and predict the occurrence of a weather event in the future based on the parameter and generate an output indicative of the occurrence.

11 Claims, 6 Drawing Sheets

(56) References Cited

U.S. PATENT DOCUMENTS

| | | | |
|---|---|---|---|
| 7,391,358 | B2 | 6/2008 | Dupree et al. |
| 7,403,854 | B1 | 7/2008 | Hurley |
| 7,505,604 | B2 | 3/2009 | Zakrzewski et al. |
| 7,729,510 | B2 | 6/2010 | Zakrzewski et al. |
| 8,818,029 | B1* | 8/2014 | Mecikalski .............. G01W 1/10 382/103 |
| 8,930,299 | B2 | 1/2015 | Pyle et al. |
| 2009/0182507 | A1* | 7/2009 | Havin .................... G01W 1/10 702/3 |
| 2010/0309330 | A1* | 12/2010 | Beck ....................... G01W 1/10 348/222.1 |
| 2012/0185414 | A1 | 7/2012 | Pyle |
| 2016/0011335 | A1* | 1/2016 | Sasaki .................... G01W 1/10 702/3 |
| 2016/0104059 | A1* | 4/2016 | Wang ................. G06K 9/00335 382/103 |
| 2016/0252614 | A1* | 9/2016 | Takechi .................. G01S 13/95 342/26 R |
| 2017/0075034 | A1 | 3/2017 | Kleeman |

OTHER PUBLICATIONS

Zheng et al., "Detecting Comma-Shaped Clouds for Severe Weather Forecasting Using Shape and Motion", IEEE Transactions on Geoscience and Remote Sensing, vol. 57, No. 6, Jun. 2019, pp. 3788-3801 (Year: 2019).*

Bouthemy et al., "Modeling of Atmospheric Disturbances in Meteorological Pictures", IEEE Transactions on Pattern Analysis and Machine Intelligence, vol. PAMI-6, No. 5, Sep. 1984, pp. 587-600 (Year: 1984).*

Rosenfeld et al., "Satellite detection of severe convective storms by their retrieved vertical profiles of cloud particle effective radius and thermodynamic phase", Feb. 23, 2008, Journal od Geophysical Research, vol. 113 (Year: 2008).*

Harris, et al, "The Definition of GOES Infrared Lighting Initiation Interest Fields," Journal of Applied Meteorology and Climatology, May 25, 2010.

Mecikalski, et al., "Forecasting Convective Initiation by Monitoring the Evolution of Moving Cumulus in Daytime GOES Imagery," IHOP_2002 Covective Initiation Special Issue, Monthly Weather Review, Oct. 12, 2004.

MacKenzie, et al., "The Advantages of Using the GOES 3.9 μm Channel for Convective and Lighting Initiation Nowcasting," JGR-Atmospheres, May 19, 2009.

Mecikalski, et al., "Cloud-Top Properties of Growing Cumulus prior to Convective Initiation as Measured by Meteosat Second Generation. Part I: Infrared Fields," Journal of Applied Meteorology and Climatology, vol. 49, Mar. 2010, pp. 521-534.

Mecikalski, et al., "Cloud-Top Properties of Growing Cumulus prior to Convective Initiation as Measured by Meteosat Second Generation. Part II: Use of Visible Reflectance," Journal of Applied Meteorology and Climatology, vol. 49, Dec. 2010, pp. 2544-2558.

Rosenfield, et al., "Satellite detection of severe convective storms by their retrieved vertical profiles of cloud particle effective radius and thermodynamic phase," Feb. 23, 2008, Journal of Geophysical Research, vol. 113.

Mecikalski, U.S. Appl. No. 15/092,988, entitled, "Systems and Methods for Forecasting Lightning and Severe Storms," filed Apr. 7, 2016.

Mecikalski, U.S. Appl. No. 15/217,731, entitled, "Systems and Methods for Forecasting Weather," filed Jul. 22, 2016.

Mecikalski, U.S. Appl. No. 15/082,744, entitled, "Systems and Methods for Forecasting Weather Based on Numerical Weather," filed Mar. 28, 2016.

Mecikalski, U.S. Appl. No. 15/073,304, entitled, "Weather Forecasting Systems and Methods," filed Mar. 17, 2016.

* cited by examiner

SYSTEMS AND METHODS FOR MONITORING UPDRAFTS IN CLOUDS

CROSS REFERENCE TO RELATED APPLICATIONS

This application is a continuation-in-part of and claims priority to U.S. patent application Ser. No. 15/217,731, entitled "Systems and Methods for Forecasting Weather" and filed on Jul. 22, 2016, which is incorporated herein by reference. U.S. patent application Ser. No. 15/217,731 claims priority to U.S. Provisional Patent Application No. 62/259,874, entitled "Systems and Methods for Forecasting Weather" and filed on Nov. 25, 2015, which is incorporated herein by reference.

STATEMENT REGARDING FEDERALLY SPONSORED RESEARCH OR DEVELOPMENT

This invention was made with Government support under AGS-1261386 awarded by the National Science Foundation. The Government has certain rights in the invention.

RELATED ART

Advances in weather forecasting enable meteorologists to provide more accurate forecasts and earlier warnings of significant weather events, such as tornadoes and severe storms and related hazards (e.g., high winds, large hail, flooding rains, etc.). Unfortunately, accurate weather forecasting remains an inherently difficult process, especially in the 0-6 hour timeframe (so-called "nowcasting"), and even better forecasting techniques are generally desired to enhance accuracy and provide even earlier warnings in advance of significant weather events.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
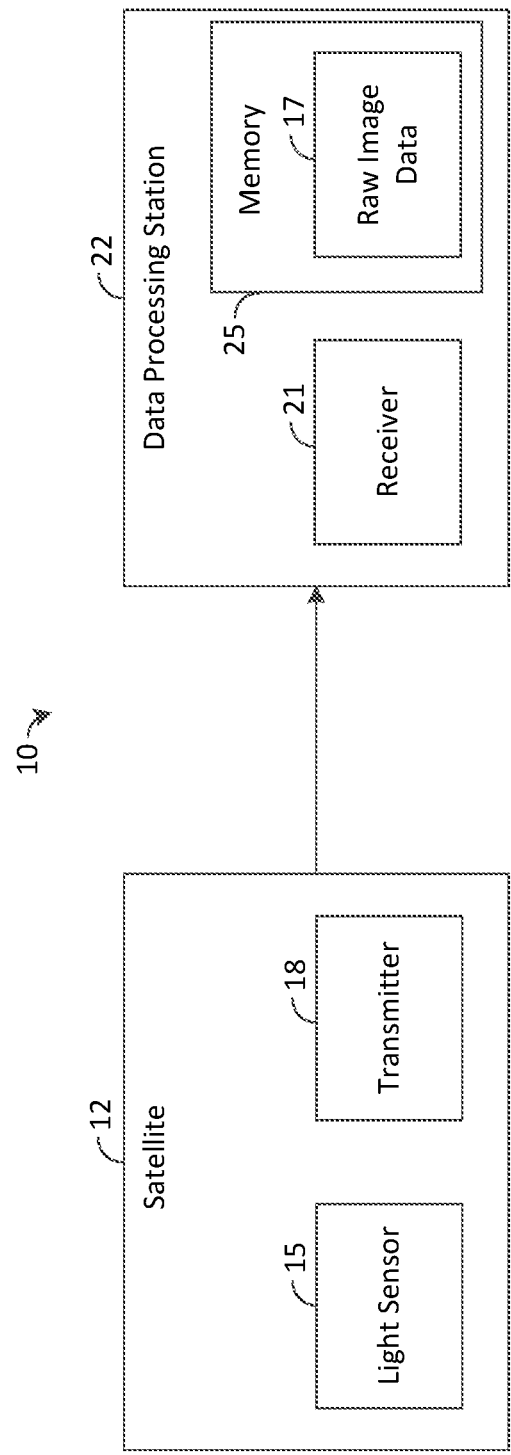
FIG. 1 is a block diagram illustrating an exemplary embodiment of a weather forecasting system.

The present disclosure generally pertains to weather forecasting systems and methods. In an exemplary embodiment, weather forecasting logic of a weather forecasting system identifies clouds likely to produce strong storms in the future based on image data collected by a rapid-scan Geostationary Operational Environment Satellite (GOES) weather satellite orbiting the Earth, such as GOES-R, -S, -T or -U. As described in further detail in the commonly-assigned U.S. Pat. No. 8,818,029, entitled "Weather Forecasting Systems and Methods" and filed on Oct. 24, 2011, which is incorporated herein by reference, the satellite transmits image data to a weather forecasting station on Earth. The station comprises weather forecasting logic that processes the image data. The GOES-R and other rapid scan geostationary satellites collect the image data at a higher resolution than previous GOES satellites. That is, GOES-R and other rapid scan geostationary satellites capture satellite image samples every 30 seconds and 1 minute (i.e., 30 second and 1 minute resolution). In one embodiment, weather forecasting logic receives image data from a satellite and communicates the image data to a data processing station.

Weather forecasting logic processes such data to identify cumulus and other cloud types within the satellite images. The weather forecasting logic applies interest field tests for each identified cumulus cloud in particular to quantify attributes of each cloud. The weather forecasting logic inputs the results of each interest field test into a weighted formula and determines a score indicating (1) the likelihood that the cumulus cloud will form precipitation in the future within a certain time period (e.g., within the next hour or some other unit of time), (2) the degree of intensity of precipitation it is likely to produce, or (3) the likelihood or degree of intensity of any other weather hazard that may occur from the storm in the near future (e.g., lightning, flooding rainfall, high winds, large hail, tornadoes). The weather forecasting logic also derives a temperature profile that is indicative of the temperature of the atmosphere surrounding each cloud using data indicative of atmospheric stability around each identified cumulus cloud and a value that is indicative of a temperature of each cloud's top. Using such temperature profile, the weather forecasting logic may be configured to derive measurements indicative of updraft strength within a cloud with improved accuracy, thus improving accuracy with which the weather forecasting logic can identify clouds that are likely to produce strong storms. Other measurements or observations indicative of the characteristics of updrafts occurring within an identified cloud may be used to assess the likelihood of the cloud producing precipitation or other weather event (e.g., tornado or severe storm) in the future, as well as the predicting a severity of the weather event. The predictions of the weather forecasting logic may then be used to provide a probabilistic weather map, thereby providing users with a graphical illustration of the areas predicted to be affected by precipitation within a specified time period (i.e., 30 minutes into the future or some other unit of time).

FIG. 1 depicts an exemplary embodiment of a weather forecasting system 10. The system 10 comprises a satellite 12 that orbits the Earth. In one exemplary embodiment, the satellite 12 is a rapid-scan Geostationary Operational Environment Satellite (e.g., GOES-R), though other types of rapid scan geostationary satellites may be used in other embodiments. As shown by FIG. 1, the satellite 12 comprises at least one light sensor 15 for detecting visible light and/or thermal energy (e.g., infrared radiation) from the Earth (e.g., sunlight reflected from the terrain, clouds, and other objects). Light and thermal energy measured by the sensor 15 is used to form data 17, referred to herein as "image data," which is wirelessly transmitted from a transmitter 18 to a receiver 21 of a data processing station 22 located on Earth. As shown by FIG. 1, the data processing station 22 has memory 25 for storing the image data 17 received from the satellite 12.

Each frame of image data 17 has a plurality of pixels in which each pixel represents a respective geographic region. As an example, as will be described in more detail hereafter, each pixel might represent a 1 kilometer (km)-by-1 km region of the Earth or a region of some other size. Each pixel has a value indicative of the visible light or radiance detected from the geographic region associated with the pixel. As an example, in one exemplary embodiment, the pixel value for visible light is measured by the reflectivity of the light from objects (e.g., clouds, terrain, etc.) that are viewable by the satellite 12 in each frame of image data 17. In addition, for infrared wavelengths, the pixel value may be converted from raw radiance into a temperature value. In this regard, the temperature value represents the approximate temperature of the illuminated objects (e.g., clouds, terrain, etc.) that are viewable by the satellite 12 within the associated region. Other types of pixel values are possible in other embodiments.

The satellite 12 may have multiple sensors 15 for sensing multiple image frames for different wavelengths of light. Exemplary techniques for sensing wavelengths of light and image frames are discussed in detail in the commonly-assigned U.S. Pat. No. 8,818,029. In the instant embodiment, for the image data captured by the satellite 12, each pixel of the frame for visible light represents a 1 km-by-1 km geographic region (i.e., has a 1 km resolution), and the frames for infrared radiance have a 4 km resolution. In other embodiments, other wavelengths and resolutions are possible and each sample may have any number of image frames.

Figure 2:
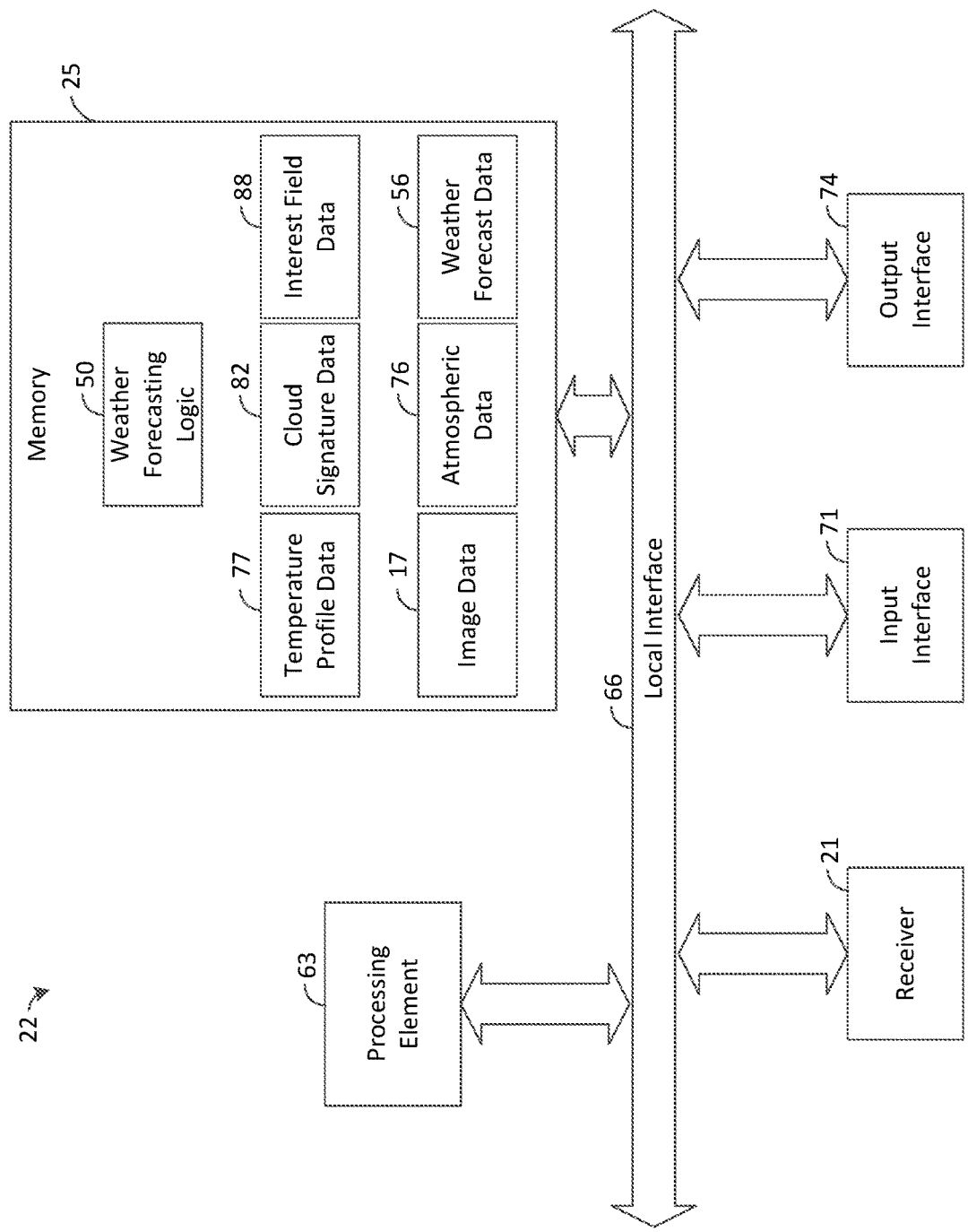
FIG. 2 depicts an exemplary embodiment of a data processing station of a weather forecasting system, such as is depicted by FIG. 1.

FIG. 2 depicts an exemplary embodiment of the data processing station 22. As shown by FIG. 2, the data processing station 22 has weather forecasting logic 50 that is configured to use the image data 17, which is used by the logic 50 to form weather forecast data 56. It should be noted that the weather forecasting logic 50 can be implemented in software, hardware, firmware, or any combination thereof. In the exemplary embodiment illustrated in FIG. 2, the weather forecasting logic 50 is implemented in software and stored in the memory 25 of the data processing station 22.

Note that the weather forecasting logic 50, when implemented in software, can be stored and transported on any computer-readable medium for use by or in connection with an instruction execution apparatus that can fetch and execute instructions. In the context of this document, a "computer-readable medium" can be any means that can contain or store a program for use by or in connection with an instruction execution apparatus.

The exemplary embodiment of the data processing station 22 depicted by FIG. 2 comprises at least one conventional processing element 63, such as a digital signal processor (DSP) or a central processing unit (CPU), that communicates to and drives the other elements within the station 22 via a local interface 66, which can include at least one bus. In some embodiments, the processing element 63 may comprise any number of processors for carrying out the functionality of the system 10 (i.e., as performed by executing the logic 50) as described herein. In the embodiment of FIG. 2, an input interface 71, for example, a keyboard, keypad, or a mouse, can be used to input data from a user of the station 22, and an output interface 74, for example, a printer or a display device, e.g., a liquid crystal display (LCD), can be used to output data to the user.

In one exemplary embodiment, the satellite image samples are taken at a rate of about 60-120 per hour. That is, approximately every 30 seconds or 1 minute, the satellite 12 captures 5 frames of image data 17 (defining a weather "sample") and wirelessly transmits such frames to the data processing station 22. Each wavelength range measured by the satellite 12 shall be referred to herein as a "channel." The frames for a given sample include a frame for visible light, a frame for infrared radiance at a wavelength of 3.9 µm, a frame for infrared radiance at a wavelength of 6.5 µm, a frame for infrared radiance at a wavelength of 10.7 µm, and a frame for infrared radiance at a wavelength of 13.3 µm. In other embodiments, a sample may include other numbers of frames and other wavelengths, whereas future geostationary satellites may have 16 or more channels in the visible and infrared spectrum.

Using multiple samples of image data 17, the weather forecasting logic is operable to identify wind vectors and certain clouds (e.g., cumulus or cumulonimbus clouds) over time (e.g., at 30 second to 1 minute time intervals) and track the clouds, as well as monitor local changes in clouds (e.g., cloud altitude changes, cloud pattern changes, etc.). In addition, the logic 50 uses atmospheric data 76 and a temperature of the top of each identified cloud based on the image data 17 from the infrared channels to derive temperature profile data 77 of the atmosphere surrounding each cloud. Based on the image data 17 from the infrared channels, the weather forecasting logic 50 determines the temperature of the cloud tops of the identified clouds over time (e.g., every 30 seconds to 1 minute). The improved spatial resolution of the image data 17 (e.g., 500 m to 2 km) from increased satellite image samples collected by the GOES-R satellite 12 helps the logic 50 to derive temperature profile data 77 based on atmospheric data 76 and the cloud top temperatures indicated by the image data 17 using known models. Note that in the context of this document, the temperature profile data 77 comprises data that is indicative of a temperature profile surrounding each identified cloud (i.e., the ambient temperature). The atmospheric data 76 is stored in memory 25 and comprises information indicative of a level of instability (e.g., wind vectors) of the atmosphere for a variety of altitudes in the geographic region depicted in each sample of image data 17. In one embodiment, the logic 50 derives an atmospheric stability profile for each sample of image data 17 using weather data input into the system 10 from other sources and stored in memory 25 as atmospheric data 76. The profile is indicative of atmospheric instability at various elevations of the region depicted in image data 17. Using the stability profile and the temperature of the top of each cloud, the logic 50 is configured to derive an ambient temperature profile that is indicative of an ambient temperature of the atmosphere at a variety of altitudes for each region in each sample of image data 17. The logic 50 stores each ambient temperature profile in temperature profile data 77.

The logic 50 also is configured to generate weather forecast data 56 by identifying a temperature at which a cloud's top extends through a capping inversion using 30 second to 1 minute time resolution observations or observations of some other time interval. As known in the art, a "capping inversion" refers to a temperature region that is characterized by temperatures that increase as altitude increases. In an exemplary embodiment, the logic 50 identifies the temperature of the top of each cloud visible in image data 17 from the infrared channels. The logic 50 is configured to derive an altitude of the cloud top by matching the measured temperature of each cloud's top with the altitude correlated with that temperature in temperature profile data 77. The logic 50 notes the altitude of the top of each cumulus cloud visible in each sample of image data 17 and monitors any change in the cloud top's altitude in successive samples. The logic 50 is configured to determine that a cloud's top has broken its capping inversion when the cloud's top reaches an altitude that exceeds a predefined threshold corresponding to an altitude indicative of a capping inversion. In an exemplary embodiment, the logic 50 is configured to identify a region indicative of a capping inversion when the logic 50 observes an increase in temperature of the environment as altitude increases across a sufficient number of samples of image data 17. The logic 50 is configured to determine that a cloud has "broken" or extended above a capping inversion when a cloud's top reaches an altitude where the ambient temperature no longer increases with altitude in a manner that is indicative of a capping inversion. In this regard, when the logic 50 determines that a cloud top has exceeded or broken its capping inversion, the logic 50 notes the temperature and altitude and stores it in atmospheric data 76 of memory 25. The logic 50 may be configured to access data that is indicative of the altitude and temperature at which clouds in a given region break their capping inversions when generating weather forecast data 56. As an example, in determining the likelihood that a cumulus cloud will produce precipitation in the future or when determining the severity of a predicted weather event associated with the cumulus cloud according to techniques described herein, the forecasting logic 50 may use an interest field that is based on the altitude or temperature at which the cloud or other nearby clouds break their capping inversions. Other techniques for using information indicative of capping inversions are possible.

It has been observed that occurrences of various weather events are associated with the presence of updrafts in mature cumulonimbus clouds, or thunderstorm. Updrafts can develop rotation within a cumulonimbus cloud, and the rotation may be visible when the cloud is viewed from above by a satellite or otherwise. As updrafts reach a level of equilibrium with their environment in which the updraft air is no longer unstable to vertical growth, the mass or airflow comprising the updraft spreads horizontally. This spreading of air or divergence may be visible when a cloud is viewed from above by a satellite or otherwise. Information about an occurrence of a particular weather event may be inferred based on rotation visible or divergence associated with a cumulonimbus cloud, such as the timeframe and nature of the occurrence. Rotation (or vorticity) and divergence fields in cumulonimbus cloud tops can be derived from cloud-motion winds made over time, such as every 30 seconds to 1 minute.

In one embodiment, the logic 50 is configured to identify updraft characteristics for each cloud identified in image data 17 based on data collected that is indicative of in-cloud processes (i.e., hydrometeor loading, latent heat release, entrainment and glaciation) observable in samples of image data (e.g., 30 second to 1 minute time resolution) 17 collected by the satellite 12. In this regard, the logic 50 is configured to identify such characteristics based on image data 17 and/or possibly other data, for example, data provided from conventional radar systems. The logic 50 additionally identifies relationships between development of clouds observed in image data 17 and lightning (e.g., initial lightning generation and lightning characteristics) in convective storms. In the instant embodiment, the logic 50 uses image data 17 collected by the satellite 12 to derive kinematic fields (e.g., cloud and updraft rotation, divergence or vorticity) for use in generating weather forecast data 56. Exemplary techniques for weather forecasting are described by U.S. Provisional Patent Application No. 62/259,728, entitled "Weather Forecasting Systems and Methods" and filed on Nov. 25, 2015, which is incorporated herein by reference, and by U.S. Provisional Patent Application No. 62/259,716, entitled "Systems and Methods for Forecasting Lightning and Severe Storms" and filed on Nov. 25, 2015, which also is incorporated herein by reference.

In an exemplary embodiment, the logic 50 may be configured to monitor variations in a cloud over time (e.g., at 30 second to 1 minute time intervals), identify information indicative of an updraft in the cloud based on the variations, and predict the occurrence of certain weather events based on the information. In some embodiments, the logic 50 may be configured to identify a cumulus or cumulonimbus cloud in a satellite image sample from image data 17. In an exemplary embodiment, the logic 50 may be configured to identify a cumulus or cumulonimbus cloud in a sample using cloud signature data 82. In this regard, in an exemplary embodiment, cloud signature data 82 may comprise information indicative of characteristics of cumulus or cumulonimbus clouds that the logic 50 may use for comparison with (i.e., clouds) pixels of a satellite image sample, as described by U.S. Pat. No. 8,818,029. If a sufficient correlation is shown by the comparison, the logic 50 may be configured to determine that a pixel of the satellite image sample shows a cumulus or cumulonimbus cloud. The logic 50 may be configured to repeat this comparison for all pixels of a sample to identify all cumulus or cumulonimbus cloud pixels in a sample, and contiguous cumulus cloud pixels may be grouped together to form a cumulus or cumulonimbus cloud object that represents a cumulus or cumulonimbus cloud, respectively. The logic 50 may be configured to track each detected cloud over time by identifying the cloud in a successive satellite image sample (e.g., 30 second to 1 minute resolution). In this regard, for consecutive samples, the same cumulus or cumulonimbus cloud is generally expected to have a similar size and shape and also to be located in a certain region depending on the wind vectors at the location of the cloud. By comparing and analyzing cloud objects in multiple samples, the same cloud may be identified in each of the samples, and the logic 50 may be configured to monitor or track the clouds over time. The logic 50 may use other suitable techniques for identifying cumulus or cumulonimbus clouds in other embodiments.

In an exemplary embodiment, the logic 50 may be configured to determine at least one variation in an identified cloud (e.g., a cumulus or cumulonimbus cloud) over time based on a comparison of samples, determine a parameter indicative of an updraft based on the at least one variation, and predict an occurrence of a weather event based on the parameter. In one embodiment, the variation may be rotation of a portion of a cumulonimbus cloud indicative of an updraft, though other variations within the cloud may be determined in other embodiments. For example, as will be described in more detail below, the logic 50 may be configured to identify an area of rotation or strong divergence associated with the cumulonimbus cloud corresponding with the updraft.

Note that there are various techniques that can be used to identify variations in an identified cloud over time. In one embodiment, the logic 50 may be configured to identify at least one variation within a cloud by identifying at least one feature within a cloud suitable for tracking over time and tracking the feature over subsequent samples. As an example, the logic 50 may be configured to identify cloud features using information stored in memory 25, such as cloud size, shape, temperature, color, or any other suitable characteristic of a cumulus or cumulonimbus cloud. In this context, a cloud "feature" may be a portion of the cloud having a unique shape relative to other portions. As an example, a cloud feature may be an outer "bump" or a jagged edge along the exterior surface of the cloud that is visible to the satellite 12 and, thus, within the satellite images captured by the satellite 12. The logic 50 may be configured to compare pixels of the same cloud in multiple samples to identify the same cloud feature in the multiple samples based on the feature's unique shape so that the cloud feature can be tracked over time.

In an exemplary embodiment, the logic 50 may be configured to track features identified with a cumulus or cumulonimbus cloud in order to determine at least one variation within the cloud. As noted above, a variation may correspond to an area of rotation or divergence associated with the cloud indicative of an updraft reaching its equilibrium level at cloud top, but in other embodiments, other types of variations are possible, such as a rate of rotation or divergence of the convective storm or cumulonimbus cloud, rate of growth of the cloud, increase in height of the cloud, movement of a boundary of a cloud, or other variation.

In some embodiments, the logic 50 analyzes the images of the cloud tops in order to identify an area of rotation and/or divergence associated with a cloud, which indicates a presence of an updraft. In this regard, the logic 50 may be configured to compare locations of the same feature in multiple samples to determine an extent to which the feature has moved within the cloud. Based on such movement, the logic 50 may determine that rotation is present in the cloud.

Figure 3:
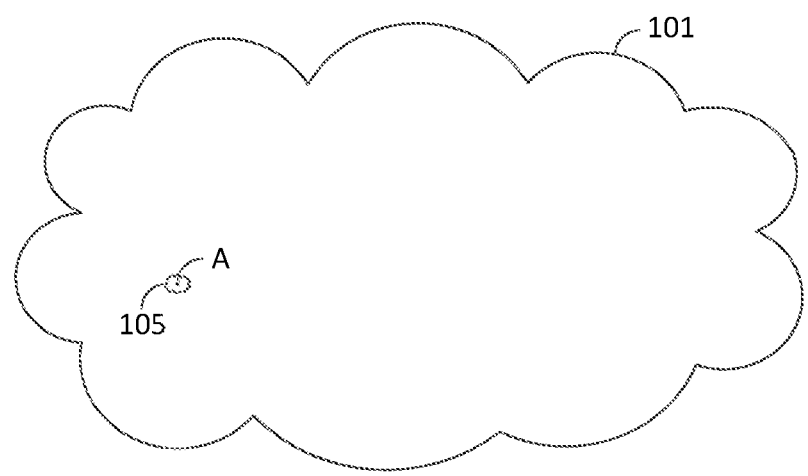
FIG. 3 shows an exemplary image of a cloud within a first sample of image data captured by a satellite.
Figure 4:
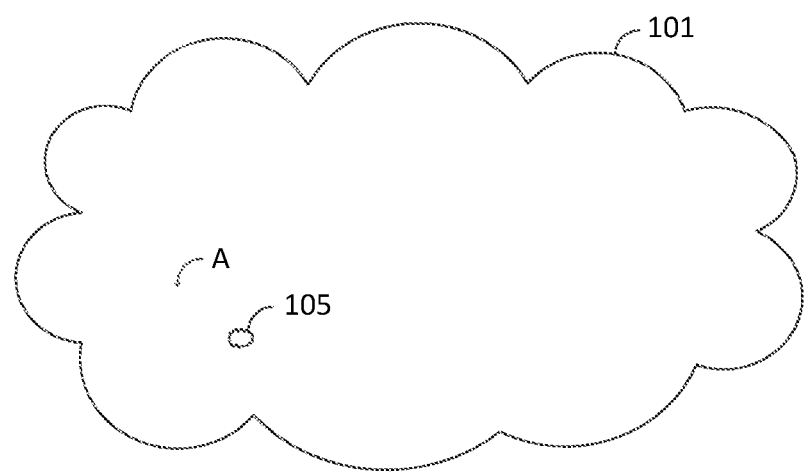
FIG. 4 shows an exemplary image of the cloud of FIG. 3 within a second sample of image data captured by a satellite.
Figure 5:
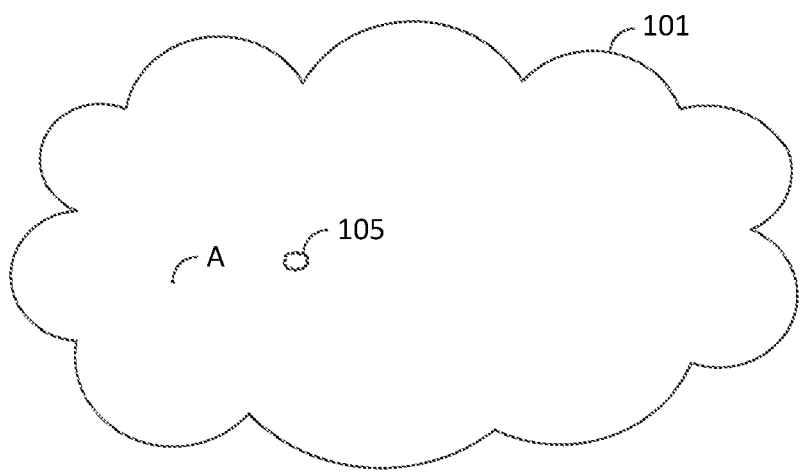
FIG. 5 shows an exemplary image of the cloud of FIG. 3 within a third sample of image data captured by a satellite.

As an example, FIG. 3 shows an exemplary image of a cloud 101 having a feature 105, such as a recognizable outer "bump," at a point A within the cloud 101. FIGS. 4 and 5 show the image of the cloud 101 for later samples. As shown by FIGS. 3-5, the feature 105 can be seen to move in a generally circular direction within the cloud (e.g., relative to point A) 101 suggesting that the feature 105 is within an area of rotation. Based on such movement, the logic 50 may determine that an updraft exists within such area of rotation or divergence. The speed of rotation or the amount of divergence of the feature 105 corresponds to the strength of the updraft at cloud top level. In this regard, a faster rotation and stronger divergence likely indicates a stronger updraft. Also, changes in the speed of the rotation or rates of divergence generally indicate whether strength of the updraft is increasing or decreasing, or may be associated with severe weather occurring at the ground beneath the convective clouds. A cloud with a strong updraft of increasing intensity is more likely to produce certain weather events in the future, such as precipitation, tornadoes, lightning, etc., than a cloud with a weak updraft of decreasing intensity.

In some embodiments, the logic 50 is configured to determine a parameter indicative of an identified updraft and predict an occurrence of a weather event in the future based on the parameter. Note that, in the instant embodiment, the parameter may be indicative of vorticity present within a cumulus cloud (i.e., rotation), but the parameter may be based on any characteristic of an updraft suitable for predicting an occurrence of a weather event in other embodiments. As an example, in some embodiments, the parameter may comprise information indicative of an estimation of the strength of the updraft or a rotation speed of the updraft or other characteristic of the updraft. In yet other embodiments, the parameter may be determined based on at least one atmospheric condition within a geographic region corresponding to the updraft, such as conditions (e.g., temperature) indicated by information stored in memory 25 as atmospheric data 76.

In some embodiments, the logic 50 is configured to determine a parameter indicative of an identified updraft and predict an occurrence of a weather event in the future based on the parameter. Note that, in the instant embodiment, the parameter may be indicative of divergence present at the top of a convective or cumulonimbus cloud, but the parameter may be based on any characteristic of an updraft suitable for predicting an occurrence of a weather event in other embodiments. As an example, in some embodiments, the parameter may comprise information indicative of an estimation of the strength of the updraft or other characteristic of the updraft. In yet other embodiments, the parameter may be determined based on at least one atmospheric condition within a geographic region corresponding to the updraft, such as conditions (e.g., temperature) indicated by information stored in memory 25 as atmospheric data 76.

The logic 50 further may be configured to define an interest field based on the parameter and store such information in memory 25 as interest field data 88. In this regard, the interest field data 88 may indicate the interest fields that are used by the logic 50 to calculate the probability or likely severity of a predicted weather occurrence. As indicated above, the interest fields may be weighted in order to increase the importance or effect of some interest fields relative to others. As an example, the logic 15 may be configured to combine (e.g., add) the results of various interest field comparisons in order to calculate an overall score indicative of the likelihood of a certain weather event or a likely severity of a certain weather event. Exemplary techniques of using interest fields to determine the probability or severity of weather events are described in U.S. Pat. No. 8,818,029. Other techniques of using the aforementioned parameter are possible in other embodiments.

Figure 6:
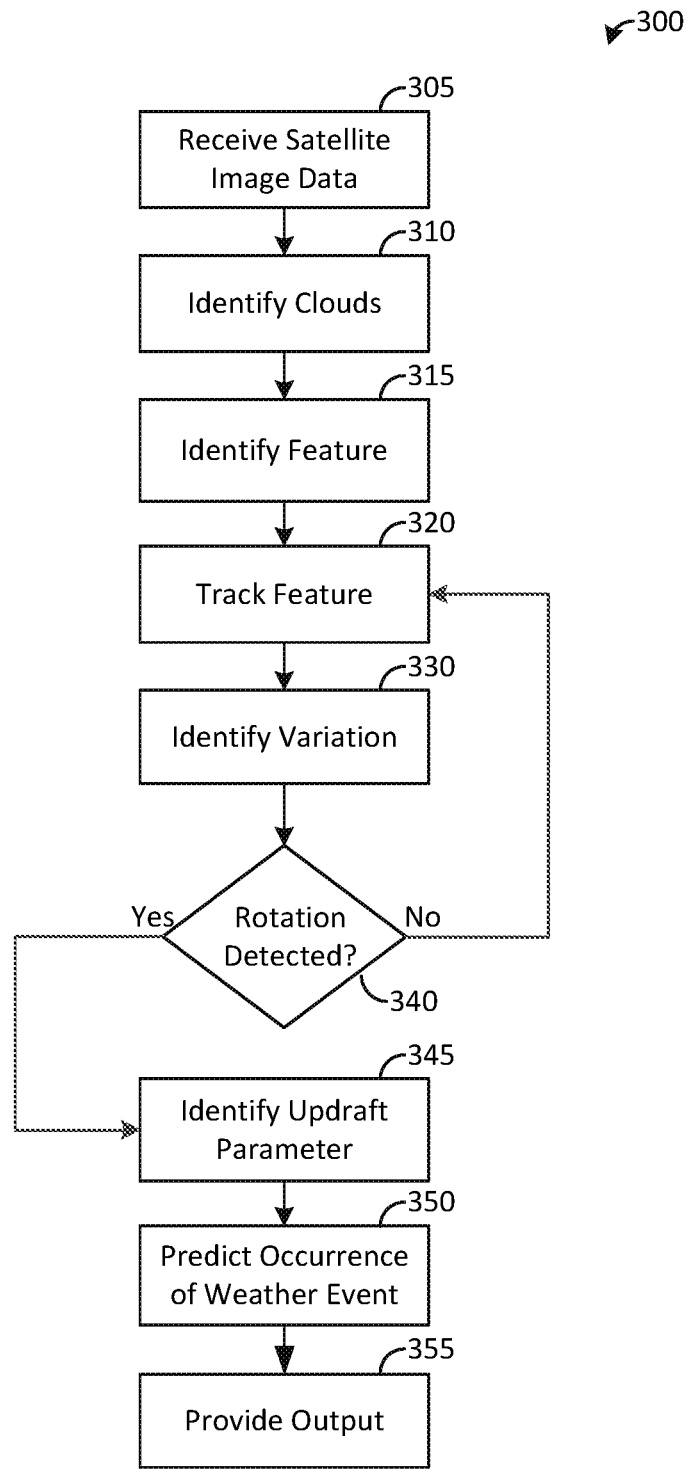
FIG. 6 is a flow chart depicting an exemplary method for predicting the occurrence of a weather event.

FIG. 6 depicts a flowchart illustrating an exemplary weather forecasting method 300 according to some embodiments as described herein. At step 305, receiver 21 of data processing station 22 may receive satellite image data from satellite 12 and store the satellite image data in memory 25 as image data 17. Note that the receiver 21 may be in communication with the transmitter 18 of satellite 12, and may be configured to receive the satellite image data via any suitable communication with the transmitter 18. In some embodiments, it is possible for satellite image data to be received by processing station 22 by communication with other suitable sources to receive satellite image data.

At step 310, weather forecasting logic 50 may retrieve image data 17 and identify a cloud visible in satellite image samples by comparing pixels of the samples with information in cloud signature data 82. The logic 50 may repeat the comparison for all pixels of a sample until all clouds in a sample have been identified. At step 315, logic 50 may analyze the images of the identified clouds in order to identify at least one feature for at least one cloud detected at step 310. The logic 50 may identify any suitable feature of the cloud that may be recognized in successive samples of satellite image data based on characteristics of the feature, such as a width, length, height, temperature, color, or reflectivity of the feature.

At step 320, the logic 50 may track a feature identified in step 315 over time by comparing successive samples of image data 17 (e.g., about every 30 seconds to 1 minute). In some embodiments, the logic 50 may track each feature identified for a cloud simultaneously, and may perform such tracking for each cloud identified in a sample. At step 330, the logic 50 may identify at least one variation in a cloud based on comparisons of the samples such as change in width, height, shape, temperature, or location of the feature over time (e.g., in successive samples). The logic 50 may identify any number of variations in a cloud and after the logic 50 identifies a variation, processing may continue to step 340.

At step 340, the logic 50 may determine whether the at least one variation is indicative of an area of rotation (i.e., that the feature is rotating) within a cloud based on comparison of the samples performed as part of the tracking. If the logic 50 determines that updraft rotation or cloud top divergence is not present, the logic 50 may return to step 320 and continue to track the feature for any amount of time to determine whether it may begin to updraft rotate or cloud top divergence in the future. If updraft rotation or cloud top divergence is detected, for example, by comparison of locations of pixels representing the features identified at step 315 in a given sample relative to locations of pixels representing a cumulus cloud comprising the feature, processing may continue to step 345.

At step 345, the logic 50 may identify or estimate a parameter that is indicative of the updraft within the area of rotation based on the at least one variation. Note that this parameter may be indicative of a variety of characteristics of an updraft, for example a strength or rate of rotation of the updraft or the amount of divergence occurring at cloud top. In one embodiment, the parameter may be indicative of a likelihood of an occurrence of a weather event, such as an occurrence of hail, lightning, a tornado, rain, or other weather event. At step 350, the logic 50 may predict an occurrence of a weather event in the future based on the parameter determined at step 345. At step 355, the logic 50 may provide an output indicative of the occurrence, such as an output to a user via output interface 74. In some embodiments, the output may comprise information indicative of information about the occurrence of the predicted weather event, such as the type of event (e.g., hail, a tornado, or other weather), predicted time of the occurrence, predicted geographic region of the occurrence, duration of the occurrence, and an intensity or severity of the occurrence. As an example, the logic 50 may provide a probabilistic weather map indicating the geographic regions where the predicted weather events are expected to occur.

To help illustrate various aspects of the present disclosure, assume that it is desirable to use the system 10 in order to predict hail. In such an example, the weather forecasting logic 50 may be configured to analyze the image data 17 and identify a cumulus or cumulonimbus cloud within a plurality of samples over time. Based on the images of the cloud over time, the logic 50 may infer various characteristics that are indicative of the likelihood of whether and when the cloud will produce hail. As an example, the logic 50 may identify an updraft within the cloud and estimate the strength of the updraft based on its speed of rotation, the growth of the cloud, and/or other factors indicated by the image data 17. The estimated strength of the updraft may also be based on factors derived from other sources of information. If the estimated updraft strength exceeds a predefined threshold, the logic 50 may determine that hail is beginning to form within the cloud and that an occurrence of hail is likely to occur within a certain time frame in the future (e.g., within the next 2 hours). In this regard, a stronger updraft is more likely to force water droplets to higher, colder altitudes where the water droplets are likely to freeze.

Once the logic 50 determines that hail is forming, the logic 50 may continue to analyze the image data 17 and possibly other sources of information in order to identify signs that the updraft is weakening. If the estimated strength of the updraft falls below a threshold, the logic 50 may determine that an occurrence of hail is likely within a certain time frame in the future (e.g., within the next 30 minutes). In this regard, as a strong updraft weakens, it reaches a point where it is no longer strong enough to keep hail aloft, and the hail begins to fall. Thus, a weakening updraft that has been previously determined to promote hail formation may indicate that an occurrence of hail is relatively imminent. Therefore, based on the estimated strength of the updraft, which is inferred using satellite imagery, the forecasting logic 50 is able to accurately predict when a cumulus cloud is likely to produce an occurrence of hail at ground level. In other embodiments, other techniques may be used to predict hail or other weather events of interest.

In various embodiments described above, information about various characteristics of a cloud, such as updraft strength, are determined and used for weather forecasting. However, it should be emphasized that such characteristics can be used for other purposes. As an example, when the logic 50 identifies a strong updraft in a cloud, the logic 50 may be configured to transmit information indicative of the updraft in order to warn a pilot or other users about the updraft so that the pilot can operate an aircraft in an attempt to avoid the updraft. In this regard, strong updrafts within clouds typically cause abrupt changes to an aircraft's velocity, thereby introducing turbulence which may discomforting or dangerous to passengers. In addition, such turbulence can add stress to the frame of the aircraft and can pose a safety hazard for the aircraft. Thus, for these and other reasons, it is generally desirable for aircraft to avoid areas within clouds that contain strong updrafts. Note that, in some embodiments, this functionality of providing warnings about cloud characteristics, such as strong updrafts, may be performed in conjunction with the weather forecasting described herein. However, it is possible to use these analysis techniques to provide updraft warnings or other types of warnings irrespective of whether weather forecasting is provided.

Figure 7:
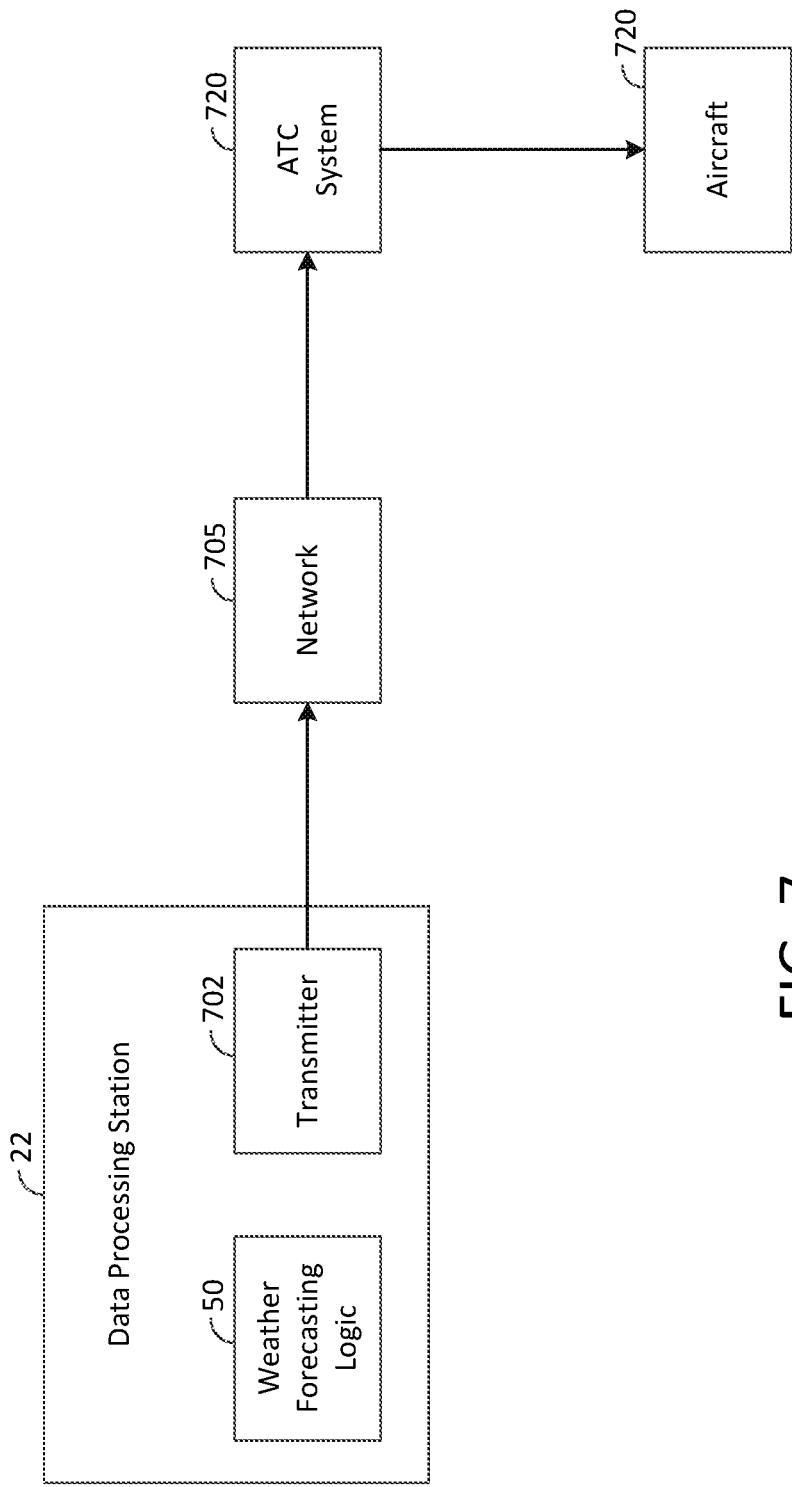
FIG. 7 is a block diagram illustrating an exemplary embodiment of a system for providing warnings based on cloud characteristics.

FIG. 7 depicts an exemplary system 700 for providing warnings, such as strong updraft warnings, based on the cloud characteristics tracked by the logic 50. In this regard, the system 700 comprises a data processing station 22 that is configured to receive satellite data and analyze the satellite data for providing weather forecasts, as described above. Unless otherwise indicated, the configuration of the data processing station may be identical or similar to the configuration described above with respect to FIG. 2.

In the embodiment depicted by FIG. 7, the data processing station 22 has a transmitter 702 that is configured to transmit information through a network 705 to an air traffic control (ATC) system 710 or other location. The network 705 may comprise any communication network (e.g., the publicly switch telephone network (PSTN), cellular network, or Internet) or any combination of networks for communicating data. The logic 50 at the data processing station 22 may be configured to transmit information indicative of updraft characteristics or other types of characteristics tracked by the station 22 to the ATC system 710, which may use such information to control or provide warnings to one or more aircraft 720, such as an airplane or helicopter.

As an example, when the logic 50 identifies an updraft having certain characteristics, the logic 50 may be configured to transmit information indicative of the updraft to the ATC system 710. In some embodiments, the logic 50 may compare the updraft characteristics to one or more thresholds to determine whether the updraft meets certain predefined criteria for initiating a warning. For example, the logic 50 may compare the rate of rotation to a predefined threshold such that, when the threshold is exceeded, the updraft is sufficiently strong to trigger a warning. In some embodiments, the rate that an updraft is increasing or decreasing in speed or strength may be a factor in deciding when a warning is to be sent. In some embodiments, updraft velocity may be determined from cloud characteristics such as cloud top rising rates as measured from the satellite data which may be a factor used to issue a warning for a given updraft. As an example, if the rate that an area or feature of a cloud is rising exceeds a predefined threshold, then the system may determine that a strong updraft exists for which a warning should be sent. Yet other types of information or updraft characteristics may be used for assessing when a warning is to be sent.

When the logic 50 determines that the criteria for a warning has been satisfied, the logic 50 may transmit a message indicative of the updraft via the transmitter 702 to the ATC system 710. The ATC system 710 may have communication and computer equipment for processing the warning as may be desired. As an example, the ATC system 710 may transmit a warning to an aircraft 720 to inform a pilot of the aircraft 720 about the updraft. Such warning may include various information about the updraft, such as information indicating the geographic location of the updraft and one or more characteristics of the updraft, such as rotation, speed or other characteristic indicative of updraft strength. Equipment on the aircraft 720 may display or otherwise communicate the warning to the pilot or other user who may then control the aircraft 720 based on the information provided. Note that it is unnecessary for the pilot be human. In this regard, the aircraft 720 may be autonomous such that it has one or more computers for automatically controlling or piloting the aircraft as it flies, and such one or more computers may use information from the warning to automatically make piloting decisions.

In some embodiments, the logic for analyzing the satellite imagery or other information described above as processed by the station 22 may reside at the ATC system 710. As an example, weather or satellite information may be transmitted from the data processing station 22 to the ATC system 710, which may then analyze the information to determine when an updraft warning is appropriate using techniques similar to those described above. In addition, in some embodiments, the weather forecast information determined by the data processing station 22 may be transmitted to the ATC system 710 in addition to the updraft warnings, and the ATC system 710 may use this weather forecast information to control the aircraft 720, such as warning pilots of hazardous weather events or directing the aircraft 720 to areas away from hazardous weather events, including strong updrafts or other types of weather events such as large hail or strong winds that may be a safety hazard. In addition, it is possible for the data processing station 22 to wirelessly transmit an updraft warning or other type of weather-related warning to aircraft 220 directly without transmitting information to the ATC system 710. Various other changes and modifications to the embodiments described herein would be apparent to a person of ordinary skill upon reading this disclosure.

Now therefore, the following is claimed:

1. A system for monitoring updrafts in clouds, comprising:

memory for storing satellite image data defining a plurality of samples, each of the samples defining a satellite image; and at least one processor configured to compare the samples and to identify a cloud within the samples, the at least one processor configured to track a rotation of at least one feature of the cloud at a top of the cloud based on the samples and to identify an updraft within the cloud based on the rotation of the at least one feature at the top of the cloud, the at least one processor configured to determine at least one variation of the identified updraft over time and determine a parameter indicative of the updraft based on the at least one variation, the at least one processor further configured to compare the parameter to a predefined threshold and provide a warning based on a comparison of the parameter to the predefined threshold.

2. The system of claim 1, wherein the parameter is indicative of a strength of the updraft.

3. The system of claim 1, wherein the at least one processor is configured to predict an occurrence of a weather event based on the comparison, and wherein the warning is for the predicted occurrence of the weather event.

4. The system of claim 1, wherein the warning is for the updraft.

5. The system of claim 1, further comprising an air traffic control system responsive to the warning for transmitting at least one warning to a pilot of an aircraft for warning the pilot of the updraft.

6. A method for monitoring updrafts in clouds, comprising:

storing, in memory, satellite image data defining a plurality of samples, each of the samples defining a satellite image;

comparing the samples with at least one processor;

identifying, with the at least one processor, a cloud within the samples based on the comparing;

tracking a rotation of at least one feature of the cloud at a top of the cloud based on the samples with the at least one processor;

identifying an updraft within the cloud based on the tracking;

determining, with the at least one processor, at least one variation of the identified updraft over time;

determining, with the at least one processor, a parameter indicative of the updraft based on the at least one variation;

comparing, with the at least one processor, the parameter to a predefined threshold; and providing a warning based on the comparing the parameter to the predefined threshold.

7. The method of claim 6, wherein the parameter is indicative of a strength of the updraft.

8. The method of claim 6, further comprising predicting an occurrence of a weather event based on the comparing the parameter to the predefined threshold, wherein the warning is for the predicted occurrence of the weather event.

9. The method of claim 6, wherein the warning is for the updraft.

10. The method of claim 6, further comprising communicating the warning to a pilot of an aircraft for warning the pilot of the updraft.

11. The method of claim 6, further comprising controlling an aircraft for avoiding the updraft based on the warning.

\* \* \* \* \*